US010673776B2

(12) United States Patent
Thyagarajan et al.

(10) Patent No.: US 10,673,776 B2
(45) Date of Patent: *Jun. 2, 2020

(54) SYSTEM AND METHOD FOR RESOURCE ISOLATION AND CONSUMPTION IN A MULTITENANT APPLICATION SERVER ENVIRONMENT

(71) Applicant: ORACLE INTERNATIONAL CORPORATION, Redwood Shores, CA (US)

(72) Inventors: Sivakumar Thyagarajan, Bangalore (IN); Jagadish Ramu, Bangalore (IN); Kshitiz Saxena, Bangalore (IN); Rahul Srivastava, Bangalore (IN); Lawrence Feigen, Watchung, NJ (US); Naman Mehta, Bangalore (IN); Prasad Subramanian, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,342

(22) Filed: Mar. 19, 2019

(65) Prior Publication Data

US 2019/0215279 A1 Jul. 11, 2019

Related U.S. Application Data

(63) Continuation of application No. 14/795,427, filed on Jul. 9, 2015, now Pat. No. 10,284,486.

(Continued)

(51) Int. Cl.
*H04L 12/911* (2013.01)
*G06F 9/50* (2006.01)

(52) U.S. Cl.
CPC ............ *H04L 47/70* (2013.01); *G06F 9/5077* (2013.01); *G06F 2209/508* (2013.01); *G06F 2209/5014* (2013.01)

(58) Field of Classification Search
CPC .................. H04L 47/70; G06F 9/5077; G06F 2209/5014; G06F 2209/508
See application file for complete search history.

(56) References Cited

U.S. PATENT DOCUMENTS

| | | | |
|---|---|---|---|
| 8,326,876 B1 | 12/2012 | Venkataraman et al. | |
| 8,621,178 B1 | 12/2013 | Lazar | |

(Continued)

FOREIGN PATENT DOCUMENTS

| | | |
|---|---|---|
| CN | 101639835 | 2/2010 |
| CN | 102170457 | 8/2011 |

(Continued)

OTHER PUBLICATIONS

International Search Report and the Written Opinion of the International Searching Authority for PCT Application No. PCT/US2015/040048, dated Oct. 15, 2015, 12 pages.

(Continued)

*Primary Examiner* — Austin J Moreau
(74) *Attorney, Agent, or Firm* — Tucker Ellis LLP

(57) ABSTRACT

In accordance with an embodiment, described herein is a system and method for resource isolation and consumption in an application server environment. The system can provide, at one or more computers, including an application server environment executing thereon, a plurality of resources which can be used within the application server environment, and one or more partitions, wherein each partition provides an administrative and runtime subdivision of a domain. The system can also configure a resource consumption management module to monitor each parti- (Continued)

tion's usage of the plurality of resources. The resource consumption management module can comprise at least one member of the group consisting of resource reservations, resource constraints, and resource notifications.

20 Claims, 11 Drawing Sheets

Related U.S. Application Data

(60) Provisional application No. 62/054,901, filed on Sep. 24, 2014, provisional application No. 62/023,076, filed on Jul. 10, 2014.

(56) References Cited

U.S. PATENT DOCUMENTS

| | | | |
|---|---|---|---|
| 2009/0183168 | A1 | 7/2009 | Uchida |
| 2010/0185963 | A1 | 7/2010 | Slik et al. |
| 2011/0213870 | A1 | 9/2011 | Cai et al. |
| 2012/0072597 | A1 | 3/2012 | Teather et al. |
| 2013/0304788 | A1 | 11/2013 | DeLuca et al. |
| 2014/0075029 | A1 | 3/2014 | Lipchuk et al. |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102681899 | 9/2012 |
| CN | 102932404 | 2/2013 |
| CN | 102932405 | 2/2013 |
| CN | 103368767 | 10/2013 |
| CN | 103455512 | 12/2013 |

OTHER PUBLICATIONS

Chinese Office Action for Chinese Application No. 201580003512.6, dated Jul. 20, 2018, 8 pages.
European Office Action, Communication pursuant to Article 94(3) EPC, for European Patent Application No. 15742463.1, dated May 3, 2019, 8 pages.
Communication pursuant to Article 94(3) EPC, dated Apr. 23, 2019 for EP Application No. 15704133.6, 4 pages.
United States Patent and Trademark Office, Notice of Allowance dated Aug. 9, 2019 for U.S. Appl. No. 15/948,721, 18 pages.
Chinese Patent Office, Office Action dated Nov. 5, 2019 for Chinese Patent Application No. 201580035413.6, 13 pages.
United States Patent and Trademark Office, Notice of Allowance dated Dec. 16, 2019 for U.S. Appl. No. 15/948,721, 18 pages.

SYSTEM AND METHOD FOR RESOURCE ISOLATION AND CONSUMPTION IN A MULTITENANT APPLICATION SERVER ENVIRONMENT

CLAIM OF PRIORITY AND CROSS-REFERENCE TO RELATED APPLICATIONS

This application is a continuation of and claims the benefit of priority to U.S. patent application entitled "SYSTEM AND METHOD FOR RESOURCE ISOLATION AND CONSUMPTION IN A MULTITENANT APPLICATION SERVER ENVIRONMENT", application Ser. No. 14/795,427, filed on Jul. 9, 2015, which application claims the benefit of priority to U.S. Provisional Application titled "SYSTEM AND METHOD FOR RESOURCE ISOLATION AND CONSUMPTION IN A MULTITENANT APPLICATION SERVER ENVIRONMENT", Application No. 62/023,076, filed Jul. 10, 2014, and to U.S. Provisional Application titled "SYSTEM AND METHOD FOR RESOURCE ISOLATION AND CONSUMPTION IN A MULTITENANT APPLICATION SERVER ENVIRONMENT", Application No. 62/054,901, filed Sep. 24, 2014; and is related to U.S. patent application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for resource isolation and consumption in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for resource isolation and consumption in an application server environment. The system can provide, at one or more computers, including an application server environment executing thereon, a plurality of resources which can be used within the application server environment, and one or more partitions, wherein each partition provides an administrative and runtime subdivision of a domain. The system can also configure a resource consumption management module to monitor each partition's usage of the plurality of resources. The resource consumption management module can comprise at least one member of the group consisting of resource reservations, resource constraints, and resource notifications.

DETAILED DESCRIPTION

In accordance with an embodiment, described herein is a system and method for resource isolation and consumption in an application server environment. The system can provide, at one or more computers, including an application server environment executing thereon, a plurality of resources which can be used within the application server environment, and one or more partitions, wherein each partition provides an administrative and runtime subdivision of a domain. The system can also configure a resource consumption management module to monitor each partition's usage of the plurality of resources. The resource consumption management module can comprise at least one member of the group consisting of resource reservations, resource constraints, and resource notifications.

Application Server (e.g., Multi-Tenant, MT) Environment

Figure 1:
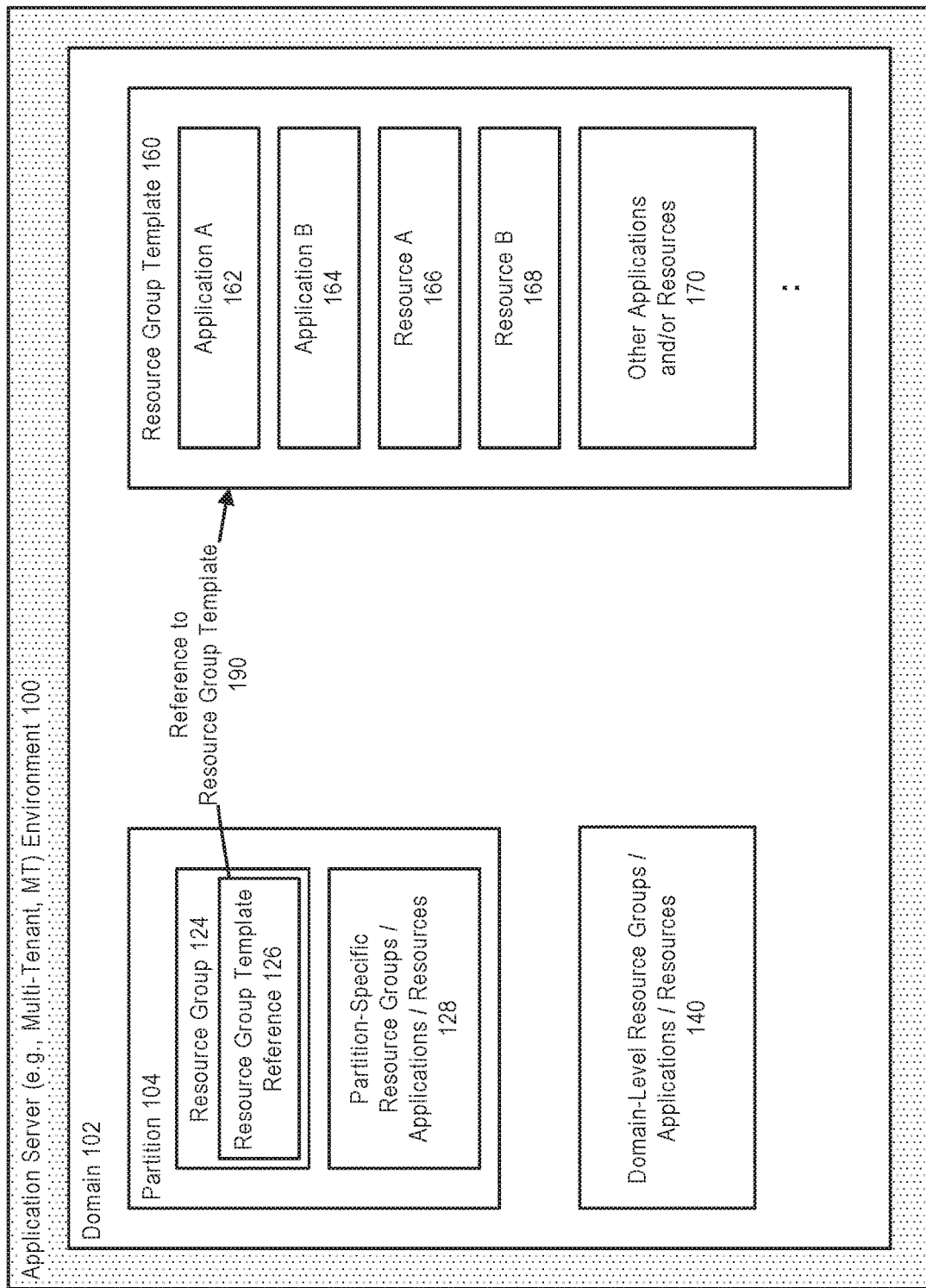
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
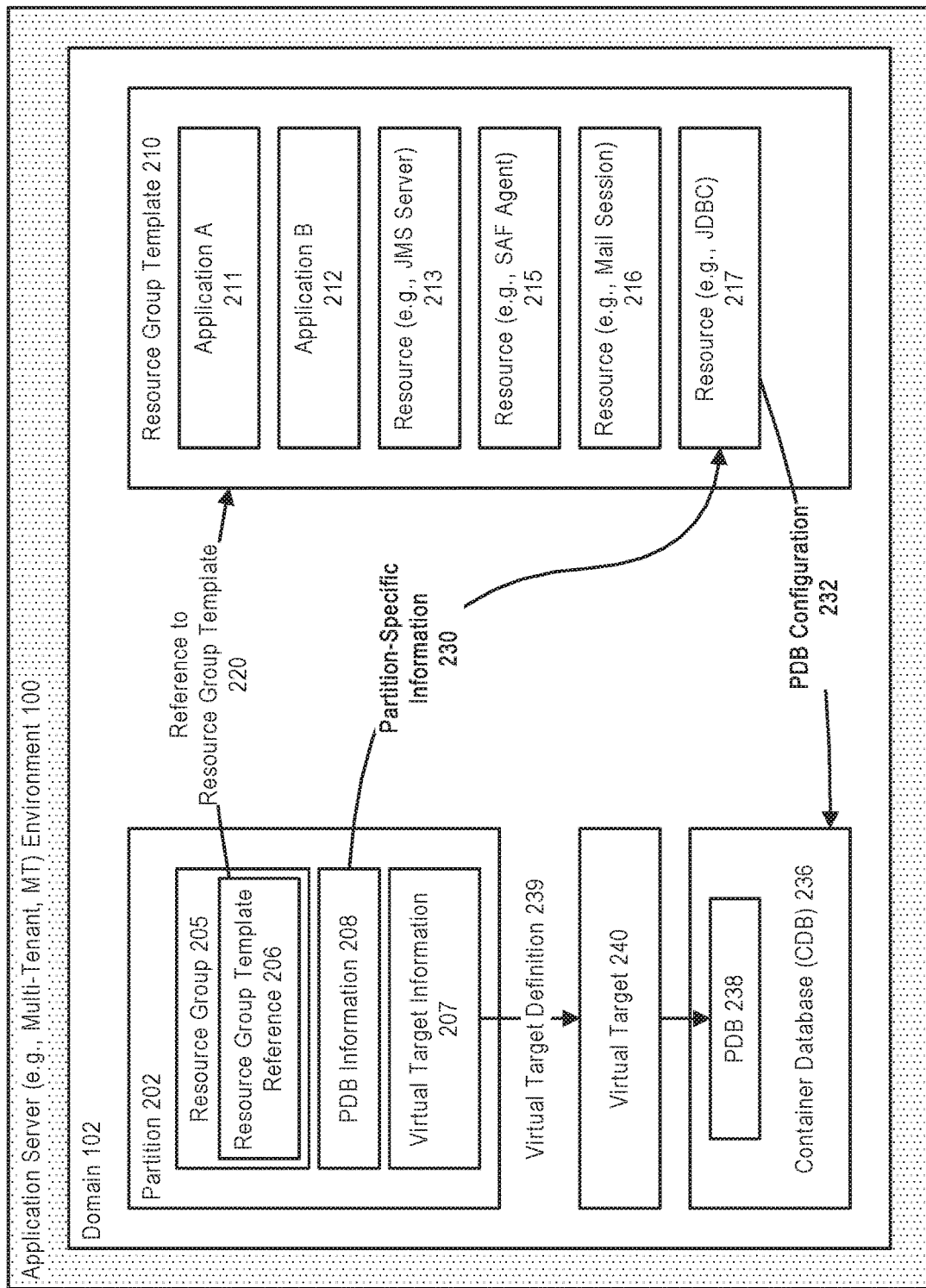
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
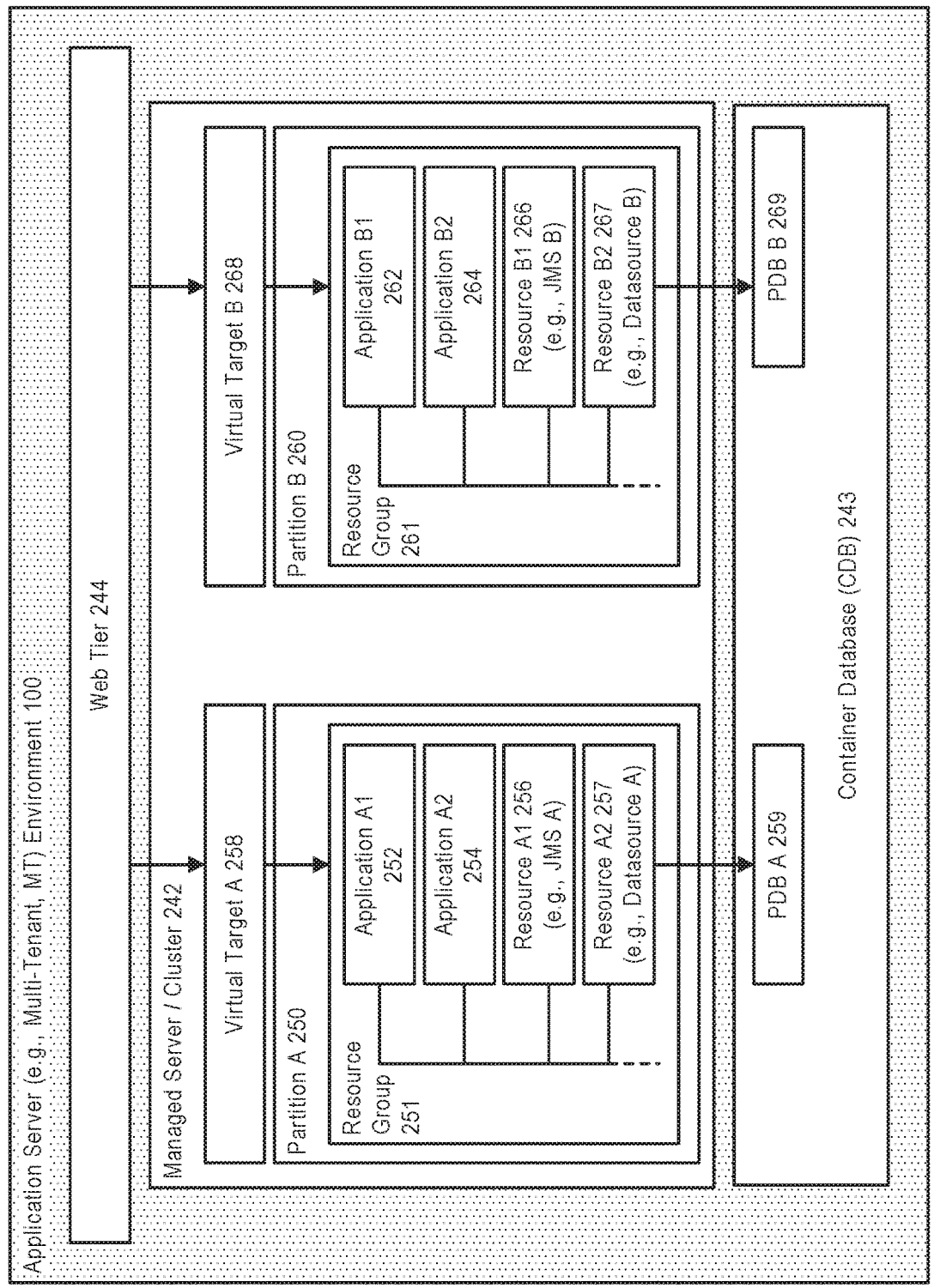
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can only be referenced by one resource group at a time, i.e., it cannot be referenced by multiple resource groups simultaneously within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
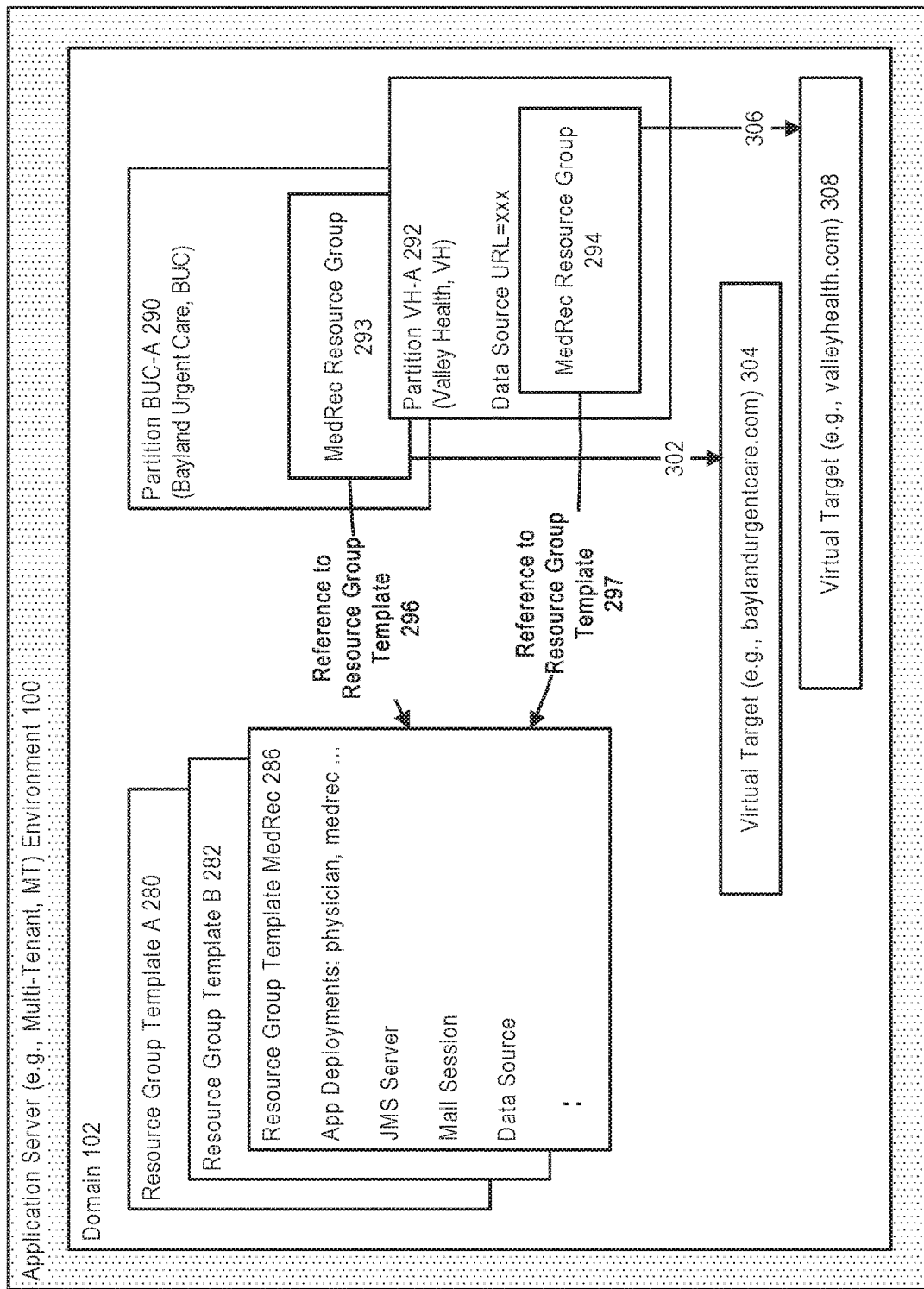
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
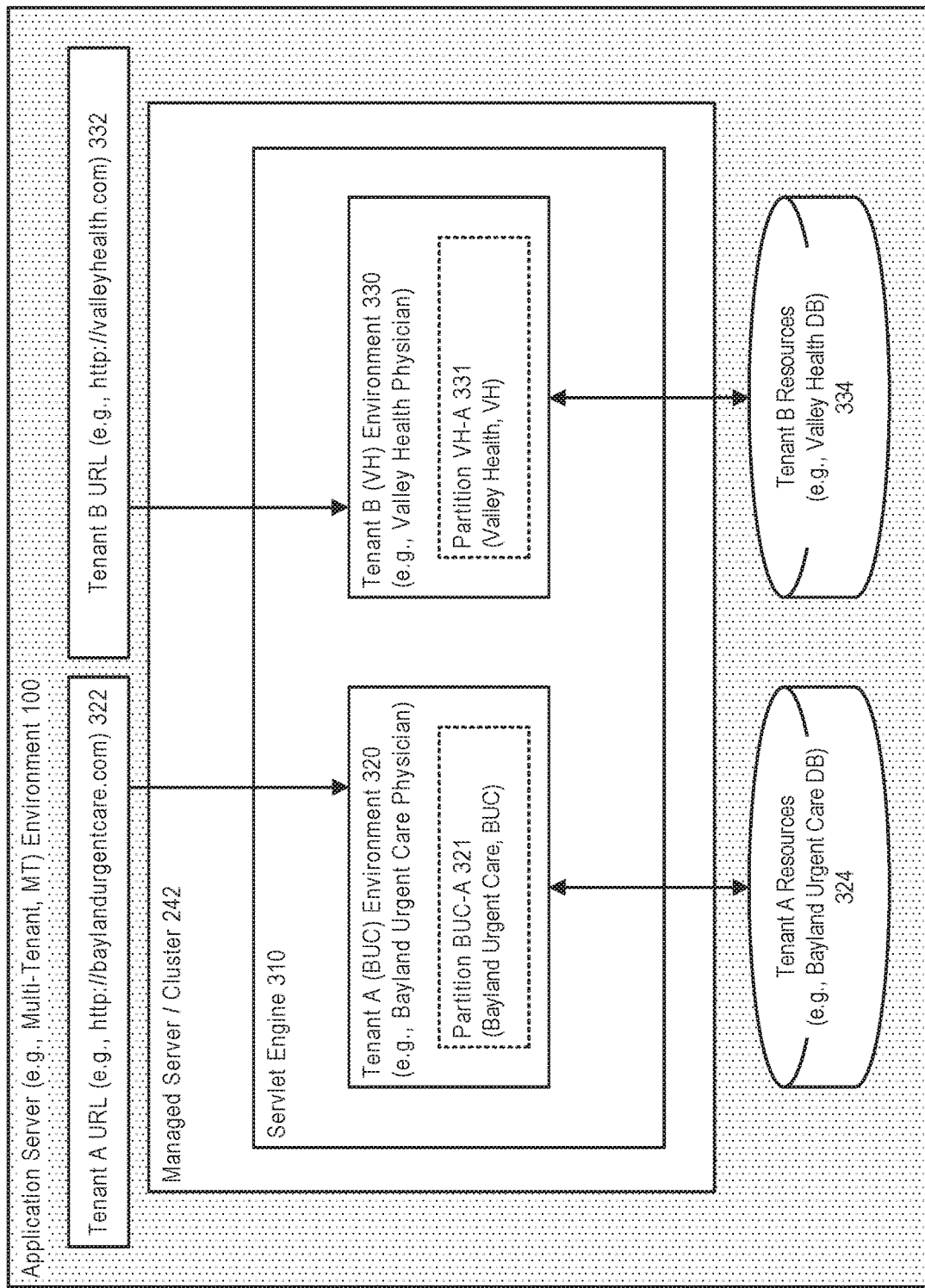
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland Urgent Care database, or a valley health database respectively. The database instances can use compatible schemas, since the same application code will execute against both databases. When the system starts the partitions, it can create the virtual targets and connection pools to the respective database instances.

Resource Isolation and Consumption

In accordance with an embodiment, improved density and enhanced utilization of a customer's computing infrastructure by allowing multiple tenants to share a single domain is achieved. However, when multiple tenants or partitions reside within the same domain, it can be necessary to determine, manage, isolate and monitor the various partitions' access and use of resources in the domain runtime in order to promote fairness in allocation of those resources, prevent contention and/or interference of access to shared resources, and to provide consistent performance for the multiple partitions and/or associated tenants.

In accordance with an embodiment, the present system utilizes resource management support provided by a Java Development Kit (e.g., JDK 8u40), in order to allow system administrators to specify resource consumption management policies (e.g., specify constraints, recourse actions and notifications) on JDK managed resources. These resources can include, e.g., CPU, Heap, File, and Network. The methods and systems described herein can also deliver a lightweight, standards-based, comprehensive and extensible resource consumption management (RCM) framework that can be used by containers and components within an application server environment for managing the consumption of shared resources.

In accordance with an embodiment, when applications are deployed by different partitions and/or different tenants within an application server environment, there are generally two issues that can arise when the applications seek to use shared resources (e.g., low-level resources such as CPU, network, and storage, or higher-level resources such as datasources, JMS connections, logging, and the like). The two issues include contention/unfairness during allocation, and variable performance and potential service level agreement (SLA) violations. Contention and unfairness during allocation can result when there are multiple requests for a shared resource and this results in contention and interference. Abnormal resource consumption requests can also happen due to benign reasons (e.g., high-traffic, DDoS attacks), misbehaving or buggy applications, malicious code and the like. Such abnormal requests can result in overloading the capacity of a shared resource, thus preventing another application access to the resource. Variable performance can lead to potential SLA violations. Contention and unfairness can result in differing performance for different applications/consumers and may result in SLA violations.

Although the various systems and methods described herein use a multi-partition/multi-tenant application server environment when discussing the issues associated with supporting resource isolation and consumption, the systems and methods are applicable to traditional deployments where multiple co-resident applications in a domain (as opposed to applications within partitions within a domain) compete with each other and their access to shared resources resulting in contention and unpredictable performance.

In accordance with an embodiment, an administrator, such as a system administrator, is provided with a mechanism to monitor access to shared resources (e.g., JDK resources such as CPU, Heap, File and Network), and enforce policies on the consumption of these resources by consumers. For example, in a multi-partition system, a system administrator can configure it so that a consumer does not over-consume a shared resource(s) and thereby starve another consumer's access to that shared resource.

In accordance with an embodiment, an administrator, such as a system administrator, can provide tiered/differentiated service levels to different consumers/customers. Additionally, the administrator can optionally configure business-specific policies (e.g., applying a different policy for a particular partition based on time-of-day to accommodate specific or forecasted workloads that would run in the partition), and have the policies enforced at the point of consumption of a shared resource.

In accordance with an embodiment, an administrator is provided with a flexible, extensible, and general purpose resource consumption framework that can be used to assist containers and components of the application server environment manage shared resources that are accessed and/or utilized by different consumers. The framework can additionally allow the specification and enforcement of fine-grained policies at different levels for different users of the RCM framework.

In accordance with an embodiment, the following definitions can be used when describing or explaining methods and systems for resource isolation and consumption.

In accordance with an embodiment, and in the context of resource consumption management, the term resource means an entity within a system, such as an application server environment, that represents something that is shared among consumers, partitions, and/or tenants and that exists in a limited quantity and whose shortfall can result in a performance change for the resource consumer.

In accordance with an embodiment, the term resource consumer can be an executable entity whose resource usage is controlled by a Resource Consumption Management (RCM) API. For example, a resource consumer within a multi-tenant application server environment could include a partition.

In accordance with an embodiment, a resource domain can bind a group of resource consumers to a resource, and imposes a common resource management policy on the resource consumer group for this resource.

A resource management policy can, in accordance with an embodiment, define reservations, constraints and notifications and can restrict the number of resources consumed by a resource consumer or throttle the rate of consumption.

In accordance with an embodiment, a constraint can be a callback that gets invoked when a resource consumption request is made for a resource. The callback can implement a policy for that resource that determines the number of resource units that may be consumed by the request.

A notification can, in accordance with an embodiment, be a callback that is invoked immediately after a resource consumption request has been handled. The notification can be used to implement a resource management policy that specifies actions to carry out following resource consumption, e.g., accounting, logging, and the like.

In accordance with an embodiment, a resource attribute describes the properties or attributes of a resource. Additionally, a resource dispenser means the code/container/logic that creates a resource. Further, to RM-enable something can mean the act of modifying a resource dispenser so that the RCM framework can manage the consumption of that resource.

A recourse action can, in accordance with an embodiment, be an action that is performed when the resource consumption by the resource consumer reaches a certain state. Recourse actions can be notifications or take precautionary action so as to prevent overuse of a resource or attempt to handle overuse. A recourse action can be performed in a different thread from the thread where the resource consumption request was made.

Figure 6:
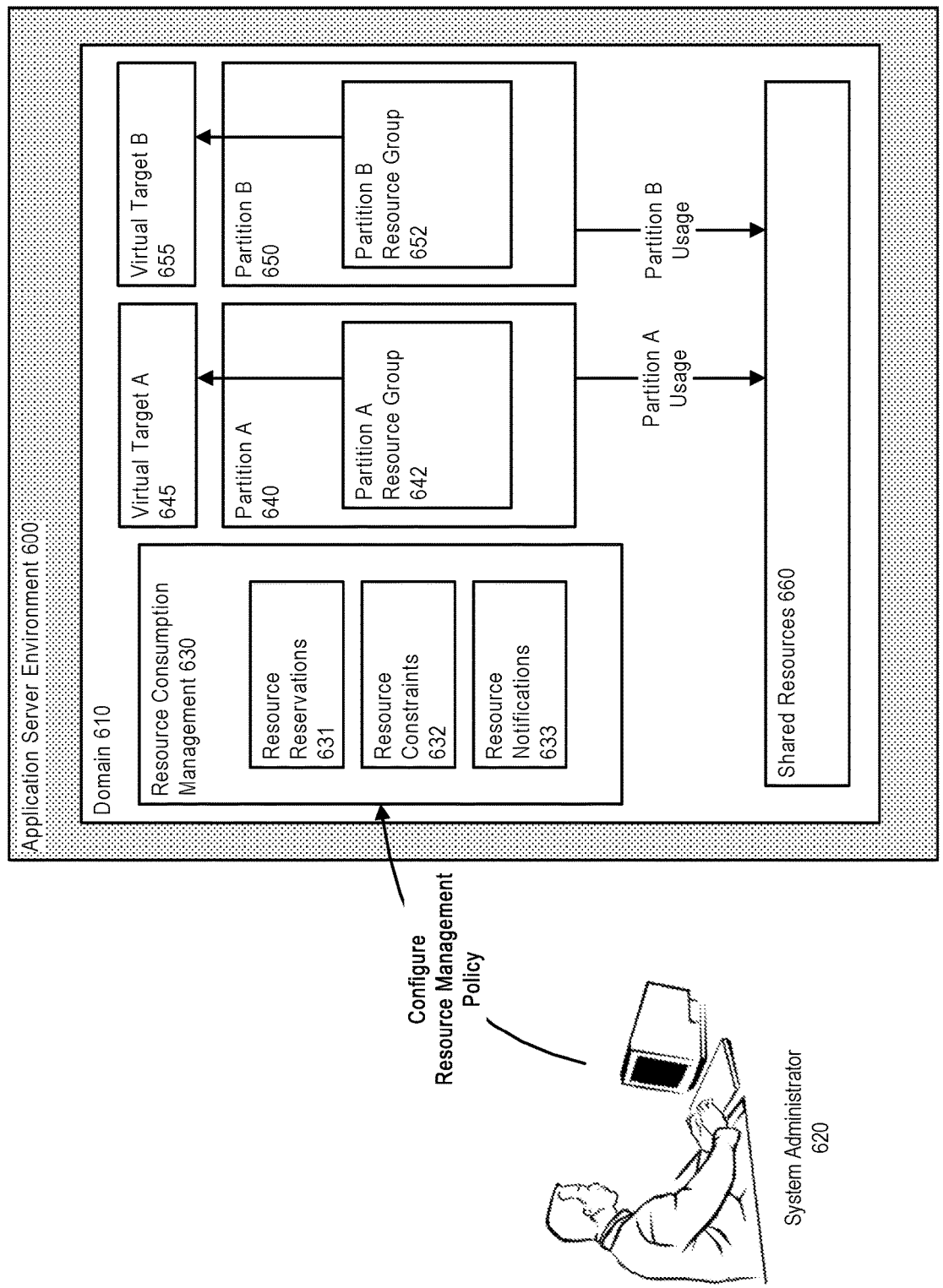
FIG. 6 illustrates resource isolation and consumption in an application server environment, in accordance with an embodiment.

FIG. 6 illustrates resource isolation and consumption in an application server environment, in accordance with an embodiment. FIG. 6 depicts an application server environment 600 containing a domain 610. A system administrator 620 can configure a resource management policy 630 within the domain. The resource management policy 630 can be configured to contain at least resource reservations 631, resource constraints 632, and resource notifications 633. The domain additionally contains partitions A and B, 640 and 650 respectively. The partitions A and B contain resource groups, 642 and 652 respectively, which are associated with virtual target A and virtual target B, 645 and 655 respectively. As shown in FIG. 6, partition A or partition B can also access shared resources 660 when, for example, the partitions run an application that requires the use of a shared resource. The shared resources 660 can comprise, but are not limited to, JDK resources, such as CPU, Heap, Network and File.

In accordance with an embodiment, the resource management policy can be configured by a system administrator, or another having adequate permission, to perform acts or tasks when the conditions configured set by the resource management policy are met by either partition A or partition B with respect to the shared resources. These acts or tasks can include, but are not limited to, constraints or notifications. Examples of constraints include slowing or stopping the use of shared resources by a partition. Examples of notifications include, but are not limited to, logging or providing notifications to an administrator.

In accordance with an embodiment, the application server environment depicted in FIG. 6 can be an Oracle WebLogic server. A WebLogic server can include ClassLoader-based isolation (classes not belonging to shared libraries of applications are isolated from each other) and the WebLogic Work Manager features, which can allow an administrator to configure how an application prioritizes the execution of its work by configuring a set of scheduling guidelines. However, these two features are fairly limited in terms of the isolation offered to applications, and in a WLS-MT deployment, it is desirable that all the resources, such as all JDK resources, be partitioned and their consumption managed to guarantee performance isolation to partitions.

Soft and Hard Isolation

In accordance with an embodiment, the distinction between isolated and shared execution environments is not binary, there can exist a continuum of choices between shared-infrastructure-and-completely-isolated execution environments and non-isolated execution environments.

In accordance with an embodiment, for a system administrator to provision code from non-trusting tenants in different partitions in the same application server environment, the system can provide support for an isolated execution environment (e.g., MVM/Isolates protection, isolated VM runtimes—[GC, Heap, Threads, system classes], debugging and diagnostics and the like.), so that the system can sandbox operations happening in partitions from each other—this can be referred to as execution isolation. This could be considered a form of hard isolation.

Through support from the RM APIs exposed by JDK 8u40, the system can also offer a softer form of isolation, where access to certain shared JDK resources are isolated, and their isolation maintained through recourse actions—this can be referred to as performance isolation.

Relationship to Work Manager (WM)

In accordance with an embodiment, the application server (e.g., a WebLogic server) work manager (WM) can allow an administrator to configure how an application prioritizes the execution of its work by configuring a set of scheduling guidelines (Max/Min and Capacity Constraints, Response-Time Request Classes). This can allow the WM to manage the threads allocated to an application, manage the scheduling Work instances to those threads, and help maintain agreements.

In accordance with an embodiment, the WM uses the time allocated for the execution of the work instance for its scheduling policies. The elapsed time for a work instance can be a combination of CPU time and non CPU time (waiting on I/O, system calls native calls, and the like) and is a better measure to specify policies against for certain use cases (e.g., I/O bound workloads).

Enhancements Through Resource Consumption Management (RCM)

In accordance with an embodiment, a WM partition fair share can use the elapsed time for executing work instances of a partition in a fair-share computation. With collocated partitions in an application server environment, such as a WebLogic server, it is important to ensure performance isolation at the CPU level as well.

For example, in the case where a partition P1 has an I/O-mostly workload, and P2 has a CPU-intensive workload and both P1 and P2 has the same WM fair-share. Assuming work instances submitted by P1 and same time to complete, P1 and P2 would be scheduled in a similar fashion by the WM (e.g., the same number of work instances would be scheduled and executed for P1 and P2). However since P2's workload is CPU intensive, its use of the shared CPU is greater than P1. This may not be desired.

In accordance with an embodiment, CPU time usage notifications provided by an API, such as a JDK RM API, accounts for the CPU time per thread accumulated to a resource context. This provides a different orthogonal way for a system administrator to specify polices and achieve performance isolation among collocated partitions at the CPU level. Both the WM partition fair-share and the fair-share policy available for the CPU time resource can be meaningfully employed by the system administrator to achieve different results. For I/O related performance isolation, fair-share policies at the file and network resource level is also available through a RCM feature.

In accordance with an embodiment, a WM can enforce its policies only on the threads that it manages. There may be threads that are not managed by the WM that are part of a resource context (e.g., threads spawned application resident in a partition), and RCM policies can be used to manage them. Through the JDK RM API support in addition to the stuck thread situations, the system can determine and mark runaway and deadlocked threads and allow a system administrator to take actions on them.

Relationship to Rule-Based Elasticity, and Watch/Notification

In accordance with an embodiment, a watch and notice component of a diagnostic framework, such as the WebLogic Diagnostics Framework (WLDF), allows a system administrator to monitor server and application states and send notifications based on criteria. These watches work on monitoring metrics on the state of the system after a resource has been consumed. RCM policies allow for enforcing policies during the consumption request. RCM policies help administrator shape precisely the usage of their shared resources by a resource consumer.

In accordance with an embodiment, the a rules-based elasticity feature can build upon the WLDF watch/notification feature to allow system administrators to construct complex rules that monitor resource usage across a cluster to make scaling administrative actions. Rule-based elasticity can focus on the use of historical trends on a 'macro' level (e.g., WLS cluster-wide or across services for instance) to monitor and perform actions that impact multiple works on a micro level, focusing on individual resource consumption requests by individual consumers to shared components, and the policies (recourse actions) that typically result in changes to a particular further use of that resource (e.g., an action that affects only the current VM).

In accordance with an embodiment, a JDK RM API can provide information on certain resource consumption metrics for JDK-managed resources on a per-resource context basis (e.g., a partition). These can be passed to a partition-scoped monitoring feature so that they can be surfaced as attributes on a corresponding PartitionRuntimeMBean.

Relationship to Partition Lifecycle Events, and Start/Stop Support

In accordance with an embodiment, a RCM framework can establish the right resource context in the thread, so that all resources consumed in the context of that thread are properly accounted against that resource context by the implementation. The RCM framework can use the partition start/stop (and enable/disable if available) events provided through an application sever feature, such as a WebLogic Server events feature, to know when a new partition is started or stopped, and create new resourcecontexts or delete them.

In accordance with an embodiment, since a partition file system may not implement a virtual file system, access to the partition's file system can be through java.[n]io, and an application server may not be able to intercept file I/O operations on it. However, the RCM framework can expose the JDK file descriptor and file related resources to the system administrator directly.

Relationship to Co-Operative Memory Management (CMM)

In accordance with an embodiment, a co-operative memory management (CMM) feature can be used to handle low-memory situations by letting different parts of the system react to memory pressure. Memory pressure can be determined externally. Applications, Middleware, and JVM residing in the system can then react to the memory pressure level. For example, in high memory pressure situations, least-used applications may be idled/hibernated, JDBC/JMS and Coherence subsystems may reduce their cache sizes, the JVM may reduce its heap size etc.

In accordance with an embodiment, the CMM feature can be used for handling memory pressure scenarios at a macro (machine) level and react after high memory situations occur. High memory pressure in a machine may be a result of external errant JVM or process in the machine), and no actions need be taken to control the "source" of the memory pressure and control the abnormal memory use at the point of (allocated and retained memory size). Policies can operate at a 'micro' (WLS Server JVM) level and can actively control the errant "resource consumer"'s use of Heap. The CMM feature and the application of RCM policies by a system administrator therefore are complementary in nature.

Resource Management Support

In accordance with an embodiment, a resource manager API, provided in a development kit, such as JDK 8u40, can separate the resource policy enforcement from the resource instrumentation and notification of consumption of resources. The RM API can allow an external manager, such as a resource consumption manager, to associate resource consumer threads in an application domain with a resource-context. The resourcecontext can provide a context for the development kit to account a resource consumption request against. The RM API can also allow an external manager, such as a resource consumption manager, to register interest for obtaining information on consumption of specific resources (identified by resourceIds) by a resourcecontext through resourcemeters.

In accordance with an embodiment, standard resourcemeter implementations provided by a development kit, such as a JDK, are: a simplemeter (simple counting of successful resource allocations for a resource context); a boundedmeter (counting with an enforcement of an upper bound); a notifyingmeter (counts and requests approval, for a configured granular county of resources, form the resource manager prior to resource allocations); and a throttlemeter (limits consumption to a specified rate per second).

In accordance with an embodiment, certain meters such as the simple and bounded meters, obtain information in a pull manner. Other meters, such as the notifyingmeter, can send pre-consumption notification calls back to a resource manager for the resource manager to enforce the policy to accept, slow, or deny the resource consumption request.

RM-Enabled JDK Resources

In accordance with an embodiment, the examples of JDK managed resources that can be RM-enabled, thus allowing a system administrator to specify resource management policies on them, include Open File Descriptions, Heap, Threads, CPU Time, and the like. Additionally, the following resources can be made available as resource consumption metrics: file descriptors, files (e.g., open file count, bytes sent, bytes received, totals), sockets and datagrams, heap, threads, active thread count, CPU time.

In accordance with an embodiment, CPU time measurements can be performed periodically by a development kit, such as JDK, monitoring thread that can sample the threads active in each ResourceContext and send updates to the meters.

In accordance with an embodiment, a G1 garbage collector can be a region-based allocator. As garbage collection is performed and objects are copied, the garbage collector can ensure that objects are copied to a region with the same resource context.

Resource Consumption Management—Resource, Trigger

In accordance with an embodiment, a system administrator can specify RCM policies around RM-enabled resources on a per-resource-consumer basis. For a resource, the system administrator can specify one or more triggers (e.g., maximum usage of the resource is limited to 400 units), as well as an action that must be performed when the trigger reaches the value. These actions may result in an activity that happens in the same thread where the resource consumption request was made (synchronous), or may be performed in a different thread from where the resource consumption request was made (asynchronous). The trigger/action combination can allow a system administrator to shape, control and limit the usage of a resource by a resource-consumer.

In accordance with an embodiment, there are several actions that a system administrator can designate. These include, but are not limited to, notify, slow, fail, and shutdown. The notify action provides a notification to a system administrator as an informational update. The slow action can throttle (e.g., slow down) the rate at which the resource is consumed. The fail action can fail on one or more resource consumption requests. The fail action can also terminate once the usage of the resource falls below the desired limit, thus allowing resource consumption again. The shutdown action can be a SIGTERM-equivalent (e.g., a signal sent to a process to request its termination), and attempts to stop a resource consumption, while allowing a consumer to ability to cleanup.

In accordance with an embodiment, the RCM is a WebLogic Server RCM framework based on a JSR-284 API and provides a light-weight RCM SPI (Service Provider Interface) and API for use by WebLogic containers, components and tools.

Figure 7:
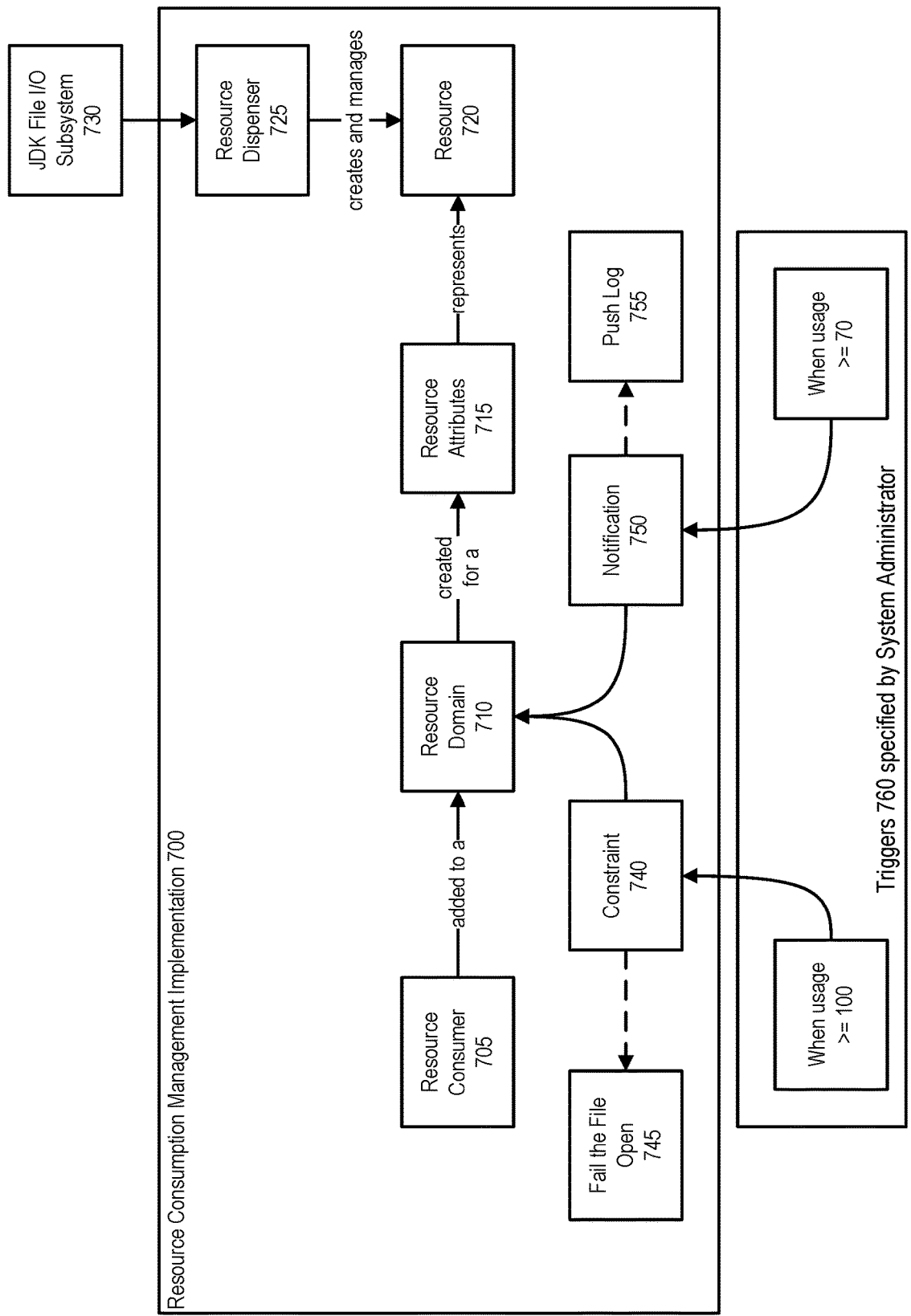
FIG. 7 illustrates a resource consumption management implementation, according to an embodiment.

Referring now to FIG. 7 which illustrates a resource consumption management implementation, according to an embodiment. As depicted, a resource consumption management implementation 700 can include a resource consumer 705, a resource domain, 710, resource attributes, 715, a resource 720, a resource dispenser 725, a constraint 740, a notification 750, triggers 760, and a JDK file I/O Subsystem 730. As illustrated in FIG. 7, the triggers 760 can be set by a system administrator, for example, within a resource consumption management policy 630 as shown in FIG. 6.

When a resource consumer 705, e.g., a partition, begins to consume resources, the use of those resources are monitored. Recalling that, for example, the consumed resources can include CPU, Heap, File, and Network, the resource consumption management implementation monitors and compares the consumed resources against triggers 760 that are set/configured/specified by a system administrator.

For example, as shown in FIG. 7, a trigger set by a system administrator is for a notification to be logged/displayed to a system administrator when usage of a resource is greater than or equal to 70 (for example, 70% of CPU time). Once CPU time passes 70% for a resource consumer, the resource consumption management policy can push a log 755 to a file, the log file indicating that a resource consumer has passed the threshold value as set by the system administrator within the trigger.

In accordance with an embodiment, when a system administrator specifies "Notify" as the recourse action type in a trigger, the WLS RCM framework can log a standard message about the usage specified in the trigger being reached. It logs message with required supplement attributes (e.g. Current Usage, Previous Usage, Notifying Quota Reached For Partition) as part of the message. The system administrator may deploy a WLDF system module to configure a watch rule to listen to the standard log message, and use notification functionality in the framework to send notifications.

Additionally, as depicted in FIG. 7, a constraint is thrown when a resource consumer's use of a resource is greater than or equal to 100 (for example, Open File Descriptors). For example, suppose a resource consumer (e.g., a partition) exceeds the limit of 100. Then, based on the trigger set by the system administrator, a constraint would be invoked, and an exception can be thrown, for example, failing to open a requested file 745.

In accordance with an embodiment, another example of a constraint is a slow-down. Slowing down can involving reducing the fair-share of the partition work manager, thereby work manager will schedule lesser number of work instances for the partition. Additionally, the work manager can also reduce the max-threads-constraint of the partition so as to reduce the maximum number of concurrent active work instances of the partition. A slow-down can also reduce the priority of application created threads. A slow-down action/constraint may be called multiple times in order to slow down a partition further. This can result in further reduced values of partition work-manager's fair-share, max-thread-constraint and application threads' priority. This can be done, for example, in the case of fair-share policy support. Similarly, a slow condition may be revoked that would result in bringing back the partition work manager fair-share and max-thread-constraint to originally configured values and also restore normal priority for application threads.

In accordance with an embodiment, a shutdown partition action can be specified as a recourse action after a trigger has been met. When a system administrator specifies a shutdown as one of the recourse actions, the partition whose resource consumption breaches the specified quota will be shutdown.

In accordance with an embodiment, upon partition shutdown, appropriate cleanup would be done and the corresponding JDK ResourceContexts can be closed. The partition and its applications would not be accessible once the partition is shutdown.

Resource Pluggability

In accordance with an embodiment, a resource implementer can use a SPI to register their resource attributes in the resource consumption management framework. An administrator can define resource management policies on these resource attributes. Through the Resource Attributes, the resource implementer can describe various characteristics of the Resource (disposable, bounded, reservable, granularity, unit of measurement, and the like). The resource implementer can also determine the granularity and the default maximum measurement delay and the rate management period of the Resource. The resource implementer can choose these values in order to control the performance impact of the measurement.

In accordance with an embodiment, the resource implementer can insert the consume( ) calls to the RCM framework to check if a quantity of a resource can be consumed. This allows the RCM framework to check and enforce resource management policies on the resource for the resource consumer requesting the access to the resource. For disposable resources, the resource implementer can insert the relinquish( ) call to the RCM framework to indicate that the resource is not used anymore by the resource container so that it is available for reuse.

In accordance with an embodiment, the RCM framework can consult an appropriate resource domain and its associated policies to check if the specified quantity can be provided to the resource consumer.

Resource Consumer Pluggability

In accordance with an embodiment, the RCM framework can allow a new resource consumer type to be plugged in through an SPI. A resource consumer can be, for example, a partition. A resource dispenser can determine, isolate and discriminate usage of a resource by one resource consumer from another resource consumer. For example, if the resource consumer type is a partition, and the resource being accessed is the number of open connections on a shared datasource, the datasource container can distinguish a connection request (and the subsequent satisfaction of that request) from a partition from a connection request by another partition. Isolation and fairness may not be guaranteed if the use of a resource cannot be clearly assigned to a unique resource consumer. f Java Development Kit's Resource Manager API In accordance with an embodiment, the RM-enabled JDK resources described above can be represented through a JSR-284 ResourceAttribute. A proxy ResourceDispenser representing the resource can be implemented, and can interface with the JDK RM API.

In accordance with an embodiment, the WLS RCM implementation can listen for Partition start-up events, and create a ResourceContext for the started Partition. JDK ResourceMeters can be created for each JDK Resource that needs to be monitored based on the RCM policy configuration specified for that Partition. These JDK ResourceMeters can then be associated with the JDK ResourceContext for the Partition.

In accordance with an embodiment, the WLS RCM implementation can register a JDK ResourceApprover (listener) with each JDK ResourceMeter (e.g. NotifyingMeter). This listener can be called back by the JDK on every pre-consumption allocation request, and the listener can then delegate this to the appropriate JSR-284 ResourceDomain in the RCM framework. The RCM framework implements the resource consumption management policy for that resource context as described in Section 4.2.8.

Figure 8:
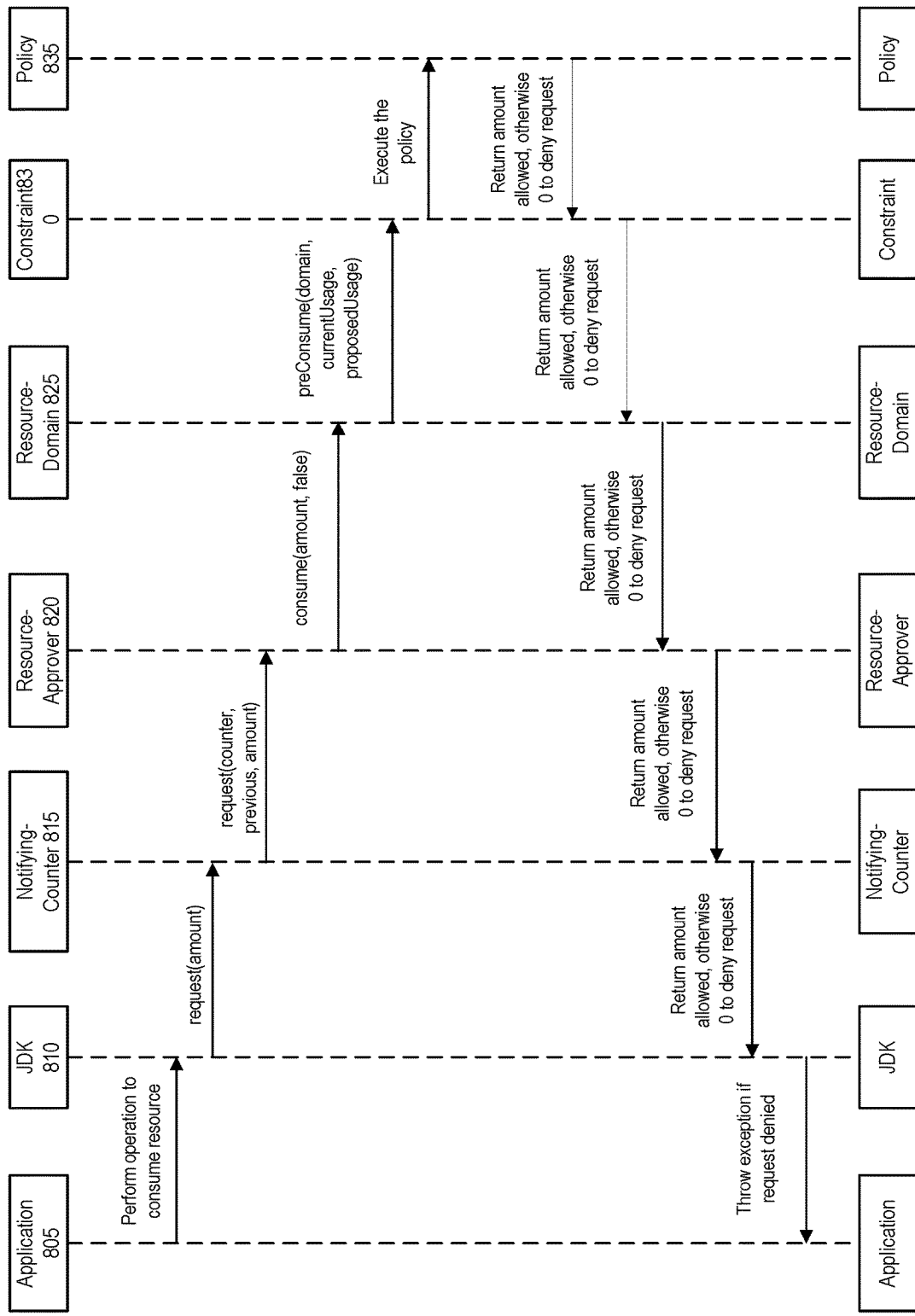
FIG. 8 illustrates a sequence diagram that shows the interactions in a resource consumption management integration, according to an embodiment.

Referring now to FIG. 8, which illustrates a sequence diagram that shows the interactions in a resource consumption management integration, according to an embodiment. The sequence depicted in FIG. 8 starts with an application 805 performing an operation that will consume resources. The JDK 810 then requests the amount. The NotifyingCounter 815 performs a resource request, and the ResourceApprover 820 then performs the consume operation. The ResourceDomain 825 performs preConsume, which can also include indicators relating to a partitions current and proposed usage. The constraint 830, as configured by a system administrator, can then execute the policy. The policy 835 will, according to its settings, either return the amount of resources requested by the application or deny the request for resources by returning zero resources. This determination is based upon the policy that can be configured by a system administrator.

Establishing the Correct Context in the Thread

In accordance with an embodiment, because the JDK RM implementation accounts the resource consumption happening in a thread to the ResourceContext associated with the thread, the system may need to establish the correct ResourceContext on the thread the prevent the mis-accounting of resources. The RCM, which can be a WLS RCM, can use a Component Invocation Context (CIC) of the current thread to determine the partition to be used for the ResourceContext. The WLS RCM implementation can register a ComponentInvocationContextChangeListener to receive notifications when a CIC changes in a thread. When this CIC change notification is received and the CIC change is due to a partition-switch (e.g., cross-partition or partition to/from Global transitions), the WLS RCM implementation can unbind the current ResourceContext from the thread, and bind the ResourceContext relevant to the new partition.

Figure 9:
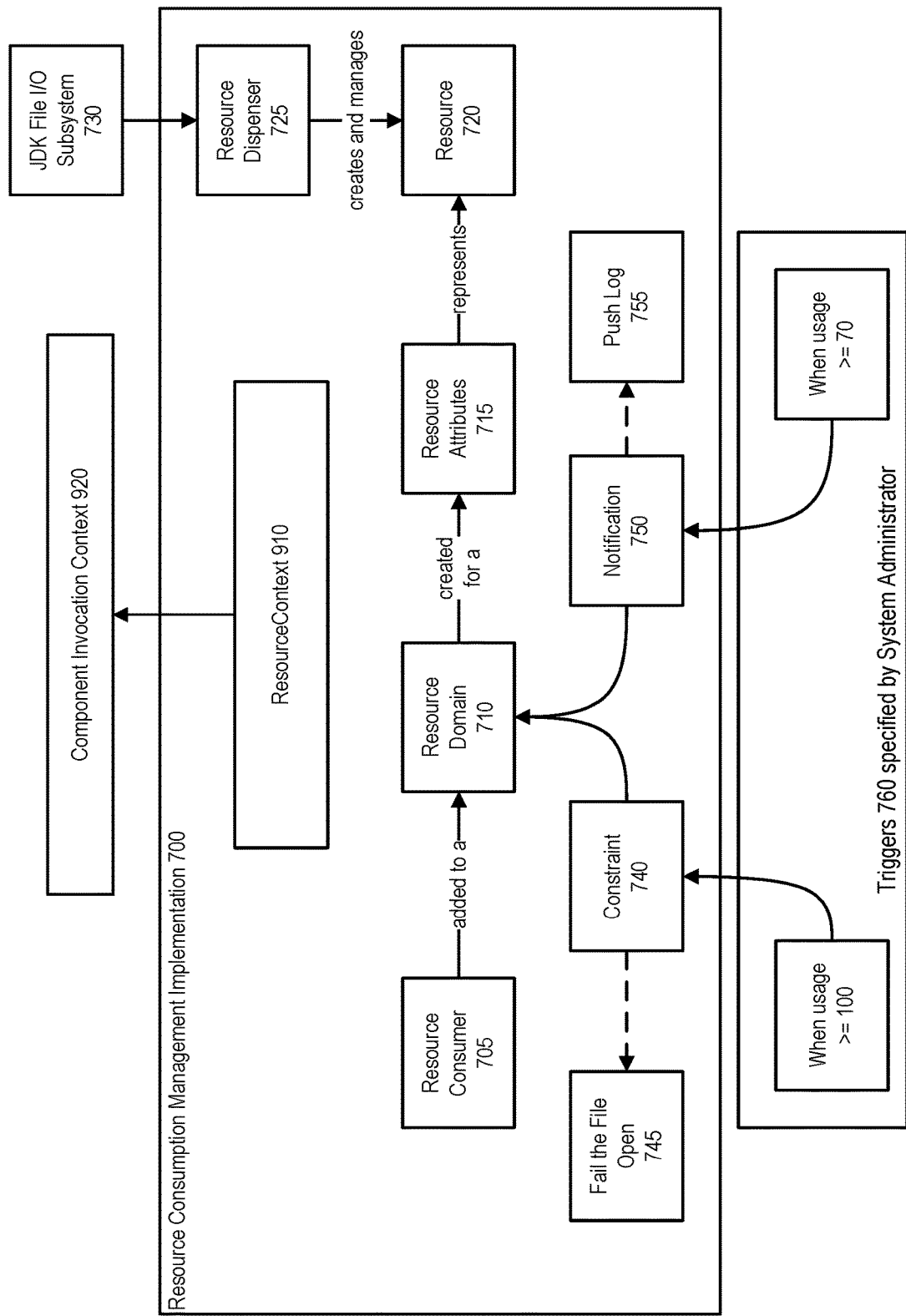
FIG. 9 illustrates a resource consumption management implementation, according to an embodiment.

Referring now to FIG. 9, which illustrates a resource consumption management implementation, according to an embodiment. As depicted, a resource consumption management implementation 700 can include a resource consumer 705, a resource domain, 710, resource attributes, 715, a resource 720, a resource dispenser 725, a constraint 740, a notification 750, triggers 760, and a JDK file I/O Subsystem 730. As illustrated the triggers 760 can be set by a system administrator, for example, within a resource consumption management policy 630 as shown in FIG. 6. Additionally, the resource consumption management implementation is associated with a resourcecontext 910, which can be set by referring to the component invocation context 920 of current thread. This can ensure that a constraint or notification, when triggered, are associated with the active resource consumption.

In accordance with an embodiment, when a thread spawns a new thread, the JDK RM API can automatically inherit the ResourceContext established in the parent Thread.

JDK Resource Metrics

In accordance with an embodiment, various components can get the partition specific resource usage metrics. The RCM implementation can expose an API for the monitoring in order to obtain partition specific resource consumption metrics through an API.

CPU Utilization

In accordance with an embodiment, a JDK Resource Management API supports measuring CPU time consumed by resource consumers of a resource context. In a multi-partition environment, each partition can map to a resource context and threads will be bound to resource contexts to do work on behalf of partitions. With CPU time metrics, the RCM framework can measure CPU Time utilized by a partition. However, representing CPU usage as a resource by absolute numbers (e.g., 1 hour, 30 minute) will not be useful for system administrators as CPU is an unbounded (unlimited) resource and it is practically of limited value (or non-intuitive) for a system administrator to specify limits/quotas for partitions in terms of absolute CPU usage time. Because of this, a CPU utilization resource type, which can be derived from CPU usage, can be represented through a percentage value (1-100). A CPU utilization percentage indicates the percentage of CPU utilized by a partition with respect to available CPU to system process. This value is calculated using a CPU consumption percentage by a partition and CPU load factor.

In accordance with an embodiment, CPU consumption percentage can be calculated based on a partition's consumption of CPU to total consumption of CPU by WLS process. However, considering the share of a partition's CPU utilization with respect to the total CPU consumption of the WLS process will not always yield a useful measure for a system administrator to refer to and/or reference when setting policies.

For example, if only one partition is the active participant in a WLS process and the machine where the WLS process is running in, is lightly loaded, treating a simple ratio of the partition's CPU use with respect to total WLS process' CPU use as the CPU utilization for that partition would result in an over-representation (a very high CPU utilization value for that partition), and unnecessarily punish that partition.

As an additional example, suppose there are two partitions in a domain. The CPU consumption percentage for partition-1 is 95, and for partition-2 is 4, and the machine where WLS process is running is lightly loaded. Even in this case, treating a simple ratio of partition's CPU use with respect to total WLS process' CPU would result in unnecessarily punishing partition-1.

In accordance with an embodiment, in order to distinguish above scenarios where the system is not heavily loaded from other scenarios in which the system may be heavily loaded either due to an application server's heavy usage of CPU or external process' heavy usage of CPU, an additional load-factor can be applied on the CPU consumption percentage. This additional factor is CPU load and can be calculated with the use of one or more APIs.

In accordance with an embodiment, in situations where there is only one partition active in the server, the load-factor can be based on the ProcessCPULoad and CONTENTION_THRESHOLD. The CONTENTION_THRESHOLD value can be, for example, 0.8 (or 80% of CPU).

In accordance with an embodiment, in situations where there is more than one partition active in the server, the RCM can use a ProcessCPULoad value to calculate the load-factor if ProcessCPULoad value is greater than 80 (CONTENTION_THRESHOLD). This indicates that the system (e.g., WLS) process is utilizing more than 80% of CPU for the period.

In accordance with an embodiment, in situations where there is more than one partition active in the server and in the case where ProcessCPULoad value is less than 0.8 (or 80% of CPU), this can indicate that the system (e.g., WLS) process is not CPU intensive. In such a case, RCM can check whether the SystemCPULoad is greater than 0.8 (or 80% of CPU). If it is greater than 0.8 (80% of CPU), SystemCPULoad can be used to calculate the load-factor. This also indicates that there are other processes in the system that are CPU intensive and the JVM process is provided with limited CPU.

In accordance with an embodiment, in either of the above situations where there is more than one partition active in the server, if the CPU usage is more than CONTENTION_THRESHOLD, it indicates that the system is loaded enough and the partition may be consuming the CPU at the expense of other partitions (e.g., resource contention is present) with respect to available CPU for the JVM process.

In accordance with an embodiment, in situations where there is more than one partition active in the server, the RCM can consider either ProcessCPULoad or SystemCPULoad as load-factor based on whether ProcessCPULoad or SystemCPULoad has exceeded their CONTENTION_THRESHOLD.

In accordance with an embodiment, in situations where there is more than one partition active in the server, when both the ProcessCPULoad and SystemCPULoad are less than their CONTENTION_THRESHOLD, load-factor will be based on ProcessCPULoad and CONTENTION_THRESHOLD.

In accordance with an embodiment, the CPU load factor can assist with determining the contention on CPU and thereby further quantify the CPU consumption metrics value derived based on JDK Resource Management API.

In accordance with an embodiment, a CPU Utilization value can be used to configure various policies and recourses like Notify, Slow, Shutdown and Fair-Share. Since the notifications from JDK on CPU time consumption are post consumption calls, it is not possible to support a per request fail re-course action for CPU Utilization resource type.

In accordance with an embodiment, the recourse actions such as notify, slow, shutdown, and the like, are taken when the decayed average of CPU utilization value is above a threshold consistently for a period of time. A generic polling mechanism based algorithm can be used both by Heap Retained and CPU Utilization resource types which helps to avoid/ignore spikes (sporadic consumption shoot ups/downs) as well.

In accordance with an embodiment, a fair-share policy is supported for CPU Utilization resource type, which works based on fair-share values of all partitions in the server.

Heap Retained

In accordance with an embodiment, an API (e.g., a JDK Resource Management API) can support measuring heap allocation and heap retained in a particular resource context. The callback for both of these resource types are post consumption. Because of this, no action can be proactively performed to control heap consumption.

In accordance with an embodiment, in case of heap allocation, a JDK RM provides callback for running total of heap allocations for a particular resource context. The heap allocation notifications from JDK can be monotonically increasing and in general does not reflect the actual heap in use by that resource context. WLDF rules can be configured to monitor heap allocation through the use of heap allocated partition scoped metrics.

In accordance with an embodiment, in a case of heap retained, the callback can originate from the JDK as the result of a garbage collector activity. The heap retained notification can have an associated accuracy level, e.g., confidence factor. High confidence measurements of heap usage can be made after a full garbage collection, thus resulting in high accuracy notification. After that the confidence of measurement heap usage reduces. A G1 garbage collection concurrent marking event completion may yield high confidence values, thus resulting in high accuracy notification. A minor garbage collection could give a low confidence on measured values, thus resulting in lower accuracy notification. Until the next garbage collection cycle, the values reported by the JDK for heap usage would have a confidence factor that reduces non-linearly. The accuracy of retained heap usage information can either be accurate (tagging all objects left after a garbage collection for a resource context and totaling the size) and expensive, or coarser and cheaper (counting G1 regions allocated to a resource consumer). Confidence factor between garbage collection cycles can be based on past allocation history and assume steady-state allocation.

In accordance with an embodiment, in a multi-partition environment, each partition can map to a resource context and threads will be bound to appropriate resource context when executing work on behalf of a partition. This can allow that resource, read heap-retained, consumption is correctly accounted for that resource context. With heap retained callback from JDK, the RCM framework can measure the amount of heap retained by a partition. As discussed above, notifications with high accuracy can be used to enforce a RCM policy for heap retained resource type. The recourse actions like notify, slow, shutdown, and the like, do not have to be invoked based on single notification from JDK. However those actions can be invoked when the decayed average of heap retained notifications for JDK are above the configured threshold consistently for a period of time. It is possible to set a default time period. For example, a default period of time used to trigger an action based on this mechanism is 100 seconds. A generic polling mechanism based algorithm can be used both by Heap Retained and CPU Utilization resource types which helps to avoid/ignore spikes (sporadic consumption shoot ups/downs) as well.

In accordance with an embodiment, the fair-share policy is supported for Heap Retained resource type, which works based on fair-share values of all partitions in the server.

Policy Evaluation, Recourse Actions/Notifications

In accordance with an embodiment, a partition (e.g., a partition within a multi-partition environment) can be associated with a resource-manager. When no resource-manager is associated with a partition, then the partition is not subject to any resource consumption management policies and its use of resources is unconstrained.

In accordance with an embodiment, for each resource-manager defined for a partition, the RCM framework can instantiate a JSR-284 ResourceDomain for the appropriate ResourceAttribute representing the ResourceId. JSR 284 Constraints and Notifications are registered against this ResourceDomain based on the user/system administrator specified trigger.

In accordance with an embodiment, a system administrator can specify one or more triggers to govern the usage of a resource. Each trigger can contain a name, value pair and action. A trigger can be specified by a system administrator to effect a course of action when resource consumption levels reach a value set by the system administrator. The WLS RCM framework executes the associated action once the usage reaches to the given value.

In accordance with an embodiment, the recourse action type specified through the action element can be one of the following four types: notify, slow, fail, shutdown.

In accordance with an embodiment, the specific set of activities that is executed by the WLS RCM framework to realize the recourse action type specified by the system administrator can be either user defined or selected from a pre-existing matrix.

For example, in accordance with an embodiment, a system administrator can want a partition P1 to only use 2000 file-descriptors. Once the usage reaches the specify value, the system administrator would like to prevent the use of any more file descriptors by that partition. Such a trigger could look like this:

```
<trigger>
<value>2000</value>
<action>fail</action>
</trigger>
```

The specified fail action can map to the throwing of IOException to the File open request. A WLS RCM framework can intercept the file open request by registering a Constraint in the ResourceDomain for the ResourceAttribute representing the FILE_OPEN ResourceType for partition P1.

In accordance with an embodiment, some of the recourse actions that are performed by the system may occur during the act of consumption (for example, a FAIL trigger set for the Open File Descriptors resource results in the throwing of an IOException during the creation of a new file). Additionally, some actions can be performed after the current consumption request (for example, notifications on CPU and Heap usage are asynchronous, and say, "shutdown" recourse actions (which results in shutting down of the relevant partition) for triggers based on those resources is performed asynchronously).

In accordance with an embodiment, synchronous actions can be realized through a JSR-284 Constraint, and asynchronous actions can be realized through a JSR-284 Notification.

Fair-Share Policy Implementation

In accordance with an embodiment, it is desirable to assure qualitatively and ensure quantitatively to system administrators the "fair" allocation of RM-enabled shared resources to different resource consumers in a multi-tenant application server environment (e.g., different partitions in a multi-partition environment).

In accordance with an embodiment, an allocation of resources to two resource domains having the same fair share value is considered unfair if the resource allocation is unequal/uneven, or in other words biased towards some of the consumers of one domain as against the other. The two resource domains may have varying resource request patterns and it can be difficult to guarantee instantaneous fair share at all times. However, it is still desired to maintain resource allocation in the ratio of their configured fair share especially when both the resource domains are competing/contending for a resource pushing the resource usage across partitions towards the system's maximum limit for that resource.

In accordance with an embodiment, the fairness in resource allocation can be calculated over a period of time to account for variation in resource consumption requests from individual resource domains. Because fairness can be computed and enforced over time, fairness does not necessarily imply equality (when fair-shares are equal) of distribution in a particular window of time. A fair-share policy implementation, when realizing that a particular resource consumer has not used their share of resources in the window, can allocate transiently a share of resources greater than the specified fair-share for that consumer. However over time, allocations can be adjusted such that they align with the fair-shares specified by the user.

The extent to which the fair-share policy can over-allocate transiently can also be based on the type of the resource. For example, in the case of "unbounded" resource, such as CPU utilization, the fair-share implementation can completely starve a resource consumer that has been very active recently to provide resources to a consumer who was falling behind on their share. However in the case of a "bounded", "disposable" and "non-revocable" resource, such as Heap allocations/retained, the fair-share policy implementation may not allow all heap allocation requests from resource consumers that have been falling behind on their share (as any granted allocations cannot be revoked later).

In accordance with an embodiment, a fair-share policy can provide the following assurance to the system administrator. When there is "contention" for a resource, and there is "uniform load" by two resource domains "over a period of time", the share of resources allocated to the two domains is "roughly" as per the fair share configured by the system administrator for those two domains.

In accordance with an embodiment, the fair share policy is supported for the CPU Utilization and heap retained resource types. For both of these resource types, the notifications from JDK can be provided post-consumption. When this occurs, the fair share policy cannot be applied exactly at the time of request for resource consumption. In the case of heap retained, the notification from JDK can be linked to garbage collection (GC) cycles and may occur later than the point when a heap consumption request was made. In the case of CPU utilization, the utilization can be determined after a fixed window of time.

In accordance with an embodiment, the request for resource consumption can be indirectly linked to work being done for a partition by the partition's work manager. Therefore if work instances being executed for a partition can be controlled based on partition's resource consumption, then fair share for that resource can still be assured.

In accordance with an embodiment, In the case of heap retained, since any heap that has been allocated earlier cannot be revoked forcibly by the system, the fair share policy controls the allocation of heap by controlling the partition's work manager fair-share.

RCM Configuration

In accordance with an embodiment, resource consumption manager (RCM) policies and recourse actions can be configured by administrators, such as system administrators. System administrators can also create reusable definitions, and create policies customized for a partition.

In accordance with an embodiment, a system administrator can create a Resource Manager definition that can then be reused across multiple partitions. For example, in a SaaS use case, a system administrator managing a domain may have a set of RCM policies that they would like to apply to every new partition they create for a particular "class" of customer (e.g., classes of Bronze, Silver, Gold). For instance, a Bronze customer's partition may have certain managed resource policies on Heap and CPU usage (e.g., Heap is limited to 2 GB). When a new Bronze customer is on-boarded and a Partition P2 is created on their behalf, it is possible for a system administrator to create a Bronze resource management policy at the domain level, and point to it during the creating of a Bronze partition. All policy configuration contained in the Bronze resource manager is then applied to P2's resource management policy. Each partition to which the resource manager is added, gets a "copy" of the managed resource policies defined in that configuration. So, for example, the Bronze resource manager was applied to P2 and P3 partitions. Both P2 and P3 each are allowed 2 GB Heap usage.

In accordance with an embodiment, a system administrator can create policies that are customized for a partition. For example, in a consolidation use case, a system administrator can specify unique resource consumption management policies for a partition created for a particular department. It is possible to create a new partition-scoped resource management policy for that partition. For instance, a system administrator creates a partition CEO for the CEO of a company. The system administrator can then also define specific managed resource policies that are applicable only to that partition (e.g., give the partition a relatively high fair-share) that are distinct from other partitions defined in the system.

Figure 10:
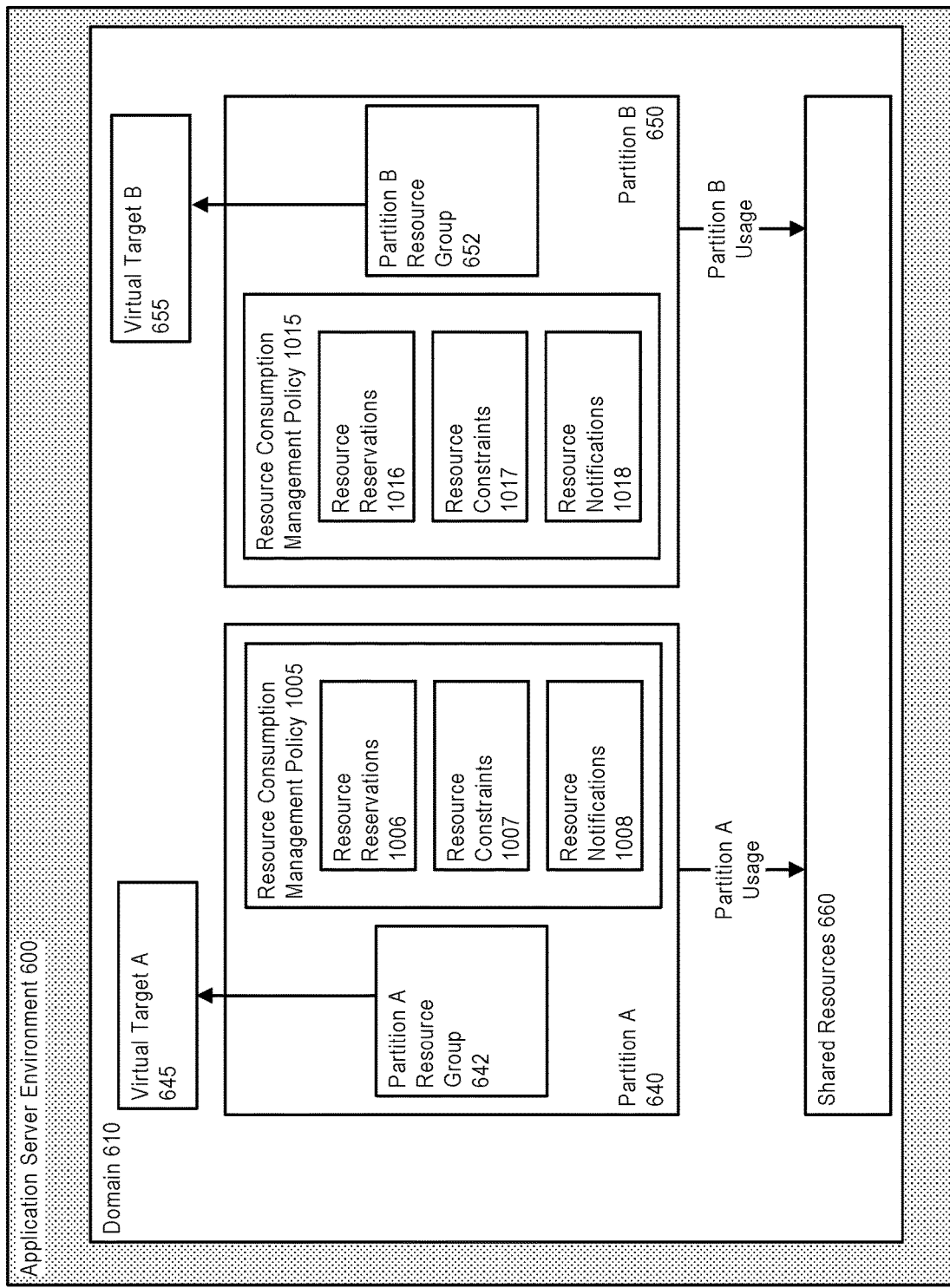
FIG. 10 illustrates resource isolation and consumption in an application server environment, in accordance with an embodiment.

FIG. 10 illustrates resource isolation and consumption in an application server environment, in accordance with an embodiment. FIG. 10 depicts an application server environment 600 containing a domain 610. The domain can contains partitions A and B, 640 and 650 respectively. The partitions A and B contain resource groups, 642 and 652 respectively, which are associated with virtual target A and virtual target B, 645 and 655 respectively. As shown in FIG. 6, partition A or partition B can also access shared resources 660 when, for example, the partitions run an application that requires the use of a shared resource. The shared resources 660 can comprise, but are not limited to, JDK resources, such as CPU, Heap, Network and File.

As described above, a system administrator can define partition specific resource consumption management policies, 1005 and 1015, respectively. These partition specific resource consumption management policies can be configured to contain partition specific resource reservations, 1006 and 1016 respectively, partition specific resource reservations, 1007 and 1017, respectively, and partition specific resource notifications, 1008 and 1018, respectively.

In accordance with an embodiment, the partition specific resource consumption management policies can be configured by a system administrator, or another having adequate permission, to perform acts or tasks when the conditions configured set by the resource management policy are met by either partition A or partition B, respectively, with respect to the shared resources. These acts or tasks can include, but are not limited to, constraints or notifications. Examples of constraints include slowing or stopping the use of shared resources by a partition. Examples of notifications include, but are not limited to, logging or providing notifications to an administrator.

What follows is an illustrative example of a definition for a resource management policy for a specified partition:

```xml
<domain>
...
    <!--Define RCM Configuration -->
    <resource-management>
        <resource-manager>
            <name>Gold</name>
            <file-open>
                <trigger>
                    <name>Gold2000</name>
                    <value>2000</value><!-- in units-->
                    <action>shutdown</action>
                </trigger>
                <trigger>
                    <name>Gold1700</name>
                    <value>1700</value>
                    <action>slow</action>
                </trigger>
                <trigger>
                    <name>Gold1500</name>
                    <value>1500</value>
                    <action>notify</action>
                </trigger>
            </file-open>
            <heap-retained>
                <trigger>
                    <name>Gold2GB</name>
                    <value>2097152</value>
                    <action>shutdown</action>
                </trigger>
                <fair-share-constraint>
                    <name>FS-GoldShare</name>
                    <value>60</value>
                </fair-share-constraint>
            </heap-retained>
        </resource-manager>
        <resource-manager>
            <name>Silver</name>
            <file-open>
                <trigger>
                    <name>Silver1000</name>
                    <value>1000</value><!-- in units-->
                    <action>shutdown</action>
                </trigger>
                <trigger>
                    <name>Silver700</name>
                    <value>700</value>
                    <action>slow</action>
                </trigger>
                <trigger>
                    <name>Silver500</name>
                    <value>500</value>
                    <action>notify</action>
                </trigger>
            </file-open>
        </resource-manager>
    </resource-management>
    <partition>
```

```xml
        <name>Partition-0</name>
        <resource-group>
            <name>ResourceTemplate-0__group</name>
            <resource-group-template>ResourceTemplate-0</resource-group-template>
        </resource-group>
        ...
        <partition-id>1741ad19-8ca7-4339-b6d3-78e56d8a5858</partition-id>
        <!-- RCM Managers are then targeted to Partitions during partition creation time or later by system administrators -->
        <resource-manager-ref>Gold</resource-manager-ref>
        ...
    </partition>
...
</domain>
```

In accordance with an embodiment, dynamic reconfiguration of all RCM elements can be supported. In certain situations, no restart of the partition and server is required for reconfiguration of resource consumption management policies.

Resource Isolation and Consumption

Figure 11:
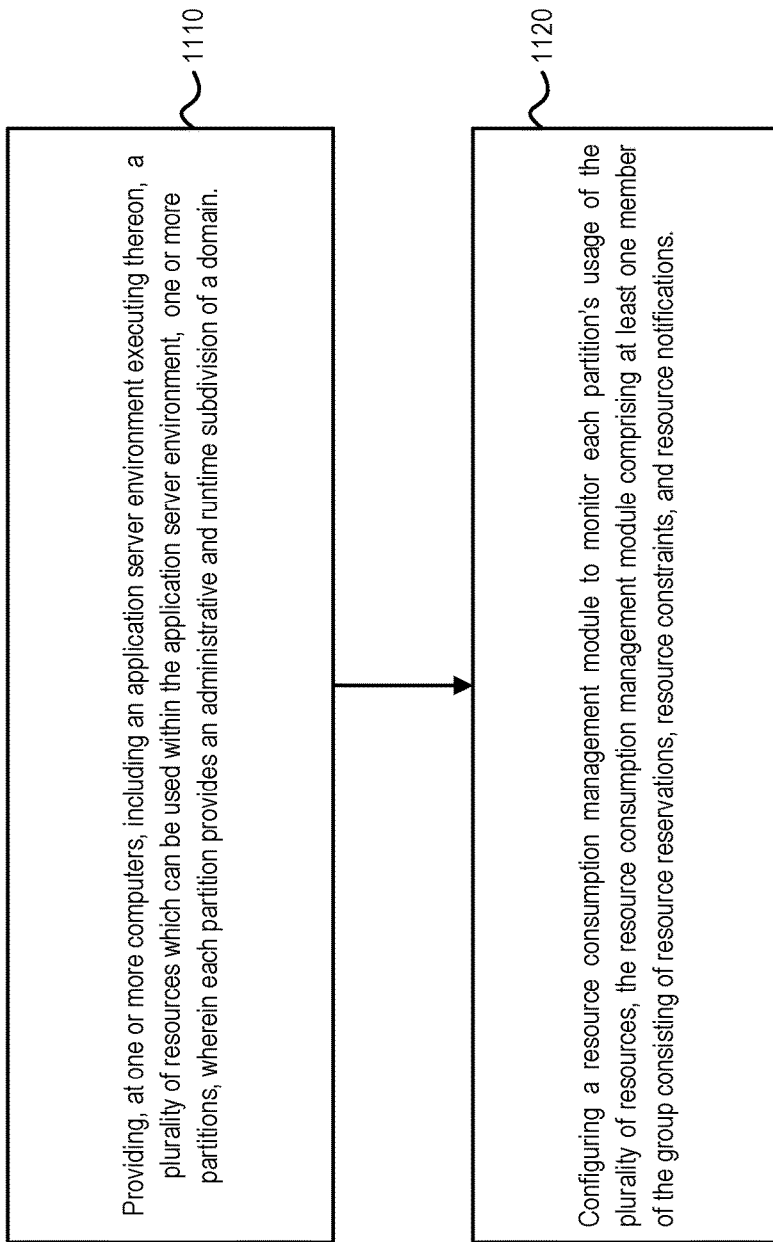
FIG. 11 depicts a flow chart for a method for resource isolation and consumption in an application server environment, according to an embodiment.

Referring now to FIG. 11, which depicts a flow chart for a method for resource isolation and consumption in an application server environment, according to an embodiment. The exemplary method can begin at step 1110 with providing, at one or more computers, including an application server environment executing thereon, a plurality of resources which can be used within the application server environment, one or more partitions, wherein each partition provides an administrative and runtime subdivision of a domain. The method can continue at step 1120 with configuring a resource consumption management module to monitor each partition's usage of the plurality of resources, the resource consumption management module comprising at least one member of the group consisting of resource reservations, resource constraints, and resource notifications.

The present invention can be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for resource isolation and consumption in an application server environment, comprising:
one or more computers, including an application server that enables deployment and execution of software applications, wherein the application server is associated with a domain configuration that is used at runtime to define a domain for execution of the software applications, a plurality of partitions, and
a shared resource pool, wherein the shared resource pool is utilized by one or more software applications deployed in the plurality of partitions;
a configurable resource consumption management module, wherein the configurable resource consumption management module comprises a plurality of resource isolation policies;
wherein a first software application deployed in a first partition of the plurality of partitions comprises a first resource isolation policy of the plurality of resource isolation policies; and
wherein the resource consumption management module enforces the first resource isolation policy for the first software application deployed in the first partition.

2. The system of claim 1, wherein the first resource isolation policy comprises a hard resource isolation policy.

3. The system of claim 2, wherein the resource consumption management module enforces the first resource isolation policy by sandboxing a set of the shared resource pool for the first software application deployed in the first partition.

4. The system of claim 1, wherein the first resource isolation policy comprises a performance isolation policy.

5. The system of claim 4, wherein the resource consumption management module enforces the first resource isolation policy through at least one of resource reservations and resource constraints.

6. The system of claim 5, wherein the resource consumption management module enforces the first resource isolation policy through resource constraints, wherein the resource consumption management module enforces the first resource isolation policy by configuring the resource constraints to perform a constraint action when the first partition uses more than a pre-defined amount of the shared resources.

7. The system of claim 6, wherein the constraint action is selected from the group consisting of slow, fail, and shutdown.

8. A method for resource isolation and consumption in an application server environment, comprising:
providing, at one or more computers, including an application server that enables deployment and execution of software applications, wherein the application server is associated with a domain configuration that is used at runtime to define a domain for execution of the software applications, a plurality of partitions,
a shared resource pool, wherein the shared resource pool is utilized by one or more software applications deployed in the plurality of partitions, and
a configurable resource consumption management module, wherein the configurable resource consumption management module comprises a plurality of resource isolation policies; and
deploying a first software application in a first partition of the plurality of partitions, the first software application comprising a first resource isolation policy of the plurality of resource isolation policies; and
enforcing, by the resource consumption management module, the first resource isolation policy for the first software application deployed in the first partition.

9. The method of claim 8, wherein the first resource isolation policy comprises a hard resource isolation policy.

10. The method of claim 9, wherein the resource consumption management module enforces the first resource isolation policy by sandboxing a set of the shared resource pool for the first software application deployed in the first partition.

11. The method of claim 8, wherein the first resource isolation policy comprises a performance isolation policy.

12. The method of claim 11, wherein the resource consumption management module enforces the first resource isolation policy through at least one of resource reservations and resource constraints.

13. The method of claim 12, wherein the resource consumption management module enforces the first resource isolation policy through resource constraints, wherein the resource consumption management module enforces the first resource isolation policy by configuring the resource constraints to perform a constraint action when the first partition uses more than a pre-defined amount of the shared resources.

14. The method of claim 13, wherein the constraint action is selected from the group consisting of slow, fail, and shutdown.

15. A non-transitory computer readable storage medium, including instructions for resource isolation and consumption in an application server environment stored thereon which when read and executed by one or more computers cause the one or more computers to perform the steps comprising:
providing, at one or more computers, including an application server that enables deployment and execution of software applications, wherein the application server is associated with a domain configuration that is used at runtime to define a domain for execution of the software applications, a plurality of partitions,
a shared resource pool, wherein the shared resource pool is utilized by one or more software applications deployed in the plurality of partitions, and
a configurable resource consumption management module, wherein the configurable resource consumption management module comprises a plurality of resource isolation policies; and
deploying a first software application in a first partition of the plurality of partitions, the first software application comprising a first resource isolation policy of the plurality of resource isolation policies; and
enforcing, by the resource consumption management module, the first resource isolation policy for the first software application deployed in the first partition.

16. The non-transitory computer readable storage medium of claim 15, wherein the first resource isolation policy comprises a hard resource isolation policy.

17. The non-transitory computer readable storage medium of claim 16, wherein the resource consumption management module enforces the first resource isolation policy by sandboxing a set of the shared resource pool for the first software application deployed in the first partition.

18. The non-transitory computer readable storage medium of claim 15, wherein the first resource isolation policy comprises a performance isolation policy.

19. The non-transitory computer readable storage medium of claim 18, wherein the resource consumption management module enforces the first resource isolation policy through at least one of resource reservations and resource constraints.

20. The non-transitory computer readable storage medium of claim 19,
wherein the resource consumption management module enforces the first resource isolation policy through resource constraints, wherein the resource consumption management module enforces the first resource isolation policy by configuring the resource constraints to perform a constraint action when the first partition uses more than a pre-defined amount of the shared resources; and
wherein the constraint action is selected from the group consisting of slow, fail, and shutdown.

* * * * *